United States Patent
Joyce et al.

(10) Patent No.: US 7,792,617 B2
(45) Date of Patent: Sep. 7, 2010

(54) WHEEL SPEED SENSING SYSTEM FOR ELECTRONIC STABILITY CONTROL

(75) Inventors: John Patrick Joyce, West Bloomfield, MI (US); Douglas William Marsden, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 786 days.

(21) Appl. No.: 11/745,524

(22) Filed: May 8, 2007

(65) Prior Publication Data

US 2007/0265756 A1 Nov. 15, 2007

Related U.S. Application Data

(60) Provisional application No. 60/798,652, filed on May 8, 2006.

(51) Int. Cl.
*G06F 17/00* (2006.01)
*G06F 19/00* (2006.01)

(52) U.S. Cl. .............................. 701/22; 701/38; 701/82; 180/411; 280/5.502

(58) Field of Classification Search .................. 701/72, 701/82, 38, 45, 51, 86; 280/5.502; 180/411, 180/197, 248
See application file for complete search history.

(56) References Cited

U.S. PATENT DOCUMENTS

| 4,884,650 A | * | 12/1989 | Fujiki et al. | 180/197 |
| 5,185,704 A | * | 2/1993 | Okubo | 701/72 |
| 6,002,979 A | * | 12/1999 | Ishizu | 701/86 |
| 6,135,229 A | * | 10/2000 | Arimatsu | 180/248 |

* cited by examiner

*Primary Examiner*—Tan Q Nguyen
(74) *Attorney, Agent, or Firm*—Angela M. Brunetti; Fredrick Owens

(57) ABSTRACT

A control system for controlling a safety system of an automotive vehicle having a transmission and a differential. The system includes left and right wheel speed sensors associated with respective vehicle wheels and generating left and right wheel speed signals, and a transmission output shaft speed sensor generating a transmission output shaft speed signal. A controller is coupled to the wheel speed sensors and the transmission output speed sensor, and determines a reference wheel speed for one of the left or right wheels as a function of the other of the left or right wheel speed signal and the transmission output shaft speed signal. The controller controls the safety system in response to the determined reference wheel speed.

20 Claims, 3 Drawing Sheets

WHEEL SPEED SENSING SYSTEM FOR ELECTRONIC STABILITY CONTROL

RELATED APPLICATION

The present invention claims priority to U.S. Provisional Application No. 60/798,652, filed on May 8, 2006, entitled "Wheel Speed Sensing System For Electronic Stability Control", the disclosure of which is incorporated by reference.

TECHNICAL FIELD

The present invention relates generally to dynamic control systems for automotive vehicles and, more specifically to a system that improves wheel speed sensor signals for use in dynamic control systems.

It is a well-known practice to control various operating dynamics of a motor vehicle to achieve active safety. Examples of active safety systems include traction control, yaw stability control and roll stability control systems. A more recent development has been to combine all the available subsystems to achieve better vehicle safety and dynamics performance. The effective operation of the various control systems requires high-accuracy and fast-response-times in the determination of the operating states of the vehicle, regardless of road conditions and driving conditions. Such vehicle operating states include the vehicle longitudinal, lateral and vertical velocities measured along the body-fixed longitudinal, lateral and vertical axes, the attitude of the vehicle body, and the travel course of the vehicle.

One data point necessary for vehicle state estimation is the linear velocity of the rotating centers of the four wheels. For example, this information can be used to assess the wheel slip used in anti-brake-lock controls and traction controls, and to estimate the longitudinal velocity of the vehicle. In roll stability control systems, wheel speed data is used to determine wheel slip and wheel lift, among other things. In order to obtain the linear corner velocities of the vehicle, wheel speed sensors are typically used.

Traditional wheel speed sensors typically comprise a rotating toothed ring (tone ring) and associated stationary pickup sensor. They operate on the principle of a magnetic field being interrupted by the passing teeth on the ring. The magnetic field modulation is registered by a Hall sensor, converted into a square wave, and amplified such that it can be evaluated. Individual wheel speed sensors are typically located close to each wheel end assembly with the tone wheel mounted onto the axle shaft. In the case of a solid live axle, the axle shaft with tone wheel and the speed sensor are typically mounted to the axle shaft or adjacent backing plate, and may deflect towards or away from each other during dynamic events with high wheel loads. Thus, during dynamic maneuvers, the variations of the wheel normal loading can affect the physical positioning of the Hall sensor with respect to the rotating tone wheel. The primary signal from a Hall sensor loses amplitude sharply as the air gap increases. In some axle design, such as semi-floating axle configurations, excessive axle deflection (>0.5 mm) can occur, resulting in the sensor moving so far from the tone wheel that sensing reliability is compromised. Hence, the measured wheel speed may not reflect the actual wheel speed, or the wheel speed signal may be lost (unreadable) entirely. Either case can present unreliable data to the vehicle safety controller that makes use of the wheel speed data.

It would, therefore be desirable to provide a more accurate way in which to determine vehicle wheel speed taking into consideration high wheel loads.

SUMMARY

The present invention provides an improved determination of the individual wheel speeds. In the present invention the individual wheel speed determination may be improved, or made more robust, by monitoring the transmission output shaft speed, and taking into consideration the drive ratio of any associated differential. Thus, a more accurate determination of the individual wheel speeds may be determined.

In one aspect of the invention, a control system for controlling a safety system of an automotive vehicle having a transmission and a differential is provided. The system includes left and right wheel speed sensors associated with respective vehicle wheels and generating left and right wheel speed signals, and a transmission output shaft speed sensor generating a transmission output shaft speed signal. A controller is coupled to the wheel speed sensors and the transmission output speed sensor, and determines a reference wheel speed for one of the left or right wheels as a function of the other of the left or right wheel speed signal and the transmission output shaft speed signal. The controller controls the safety system in response to the determined reference wheel speed.

In a further aspect of the invention, a method of controlling an automotive vehicle having a transmission and an associated differential operatively driving left and right wheels, the wheels each having a wheel speed sensor, includes generating left and right wheel speed signals from each respective wheel speed sensor; determining a transmission output shaft speed; determining a drive gear ratio of the differential; determining a reference wheel speed for one of the left or right wheels as a function of the other of the left or right wheel speed signal, the transmission output shaft speed, and the drive gear ratio; and controlling a safety system with one of the determined reference wheel speed or generated wheel speed.

In a further aspect, the invention includes the step of comparing a difference between the respective generated wheel speed signal and the determined reference wheel speed with a fault tolerance and, when the difference exceeds the fault tolerance, controlling the safety system with the determined reference wheel speed. Alternatively, when the difference is within the fault tolerance, the system controls the safety system with the generated reference wheel speed. Further, the fault tolerance may be modified in response to a load condition of the wheels. For example, the system may control the safety system with the reference wheel speed for a wheel experiencing increased loading as a result of a vehicle dynamic state.

In a further example, the right and left reference wheel speeds are determined according to:

$$RWS = [(OSS/\text{drive ratio}) * 2] - LWS_g$$

$$LWS = [(OSS/\text{drive ratio}) * 2] - RWS_g$$

wherein OSS is the transmission output shaft speed, and $LWS_g$ and $RWS_g$ are the generated left and right wheel speed signals, respectively.

The present invention has several advantages including increasing the robustness of stability control system faults due to sensor speed signal dropout. It is also not dependent on the vehicle inertial sensing configuration. Further, it will typically not require any new hardware when implemented on vehicle with rollover control sensing systems.

Other advantages and features of the present invention will become apparent when viewed in light of the detailed description of the preferred embodiment when taken in conjunction with the attached drawings and appended claims.

DETAILED DESCRIPTION

Figure 1:
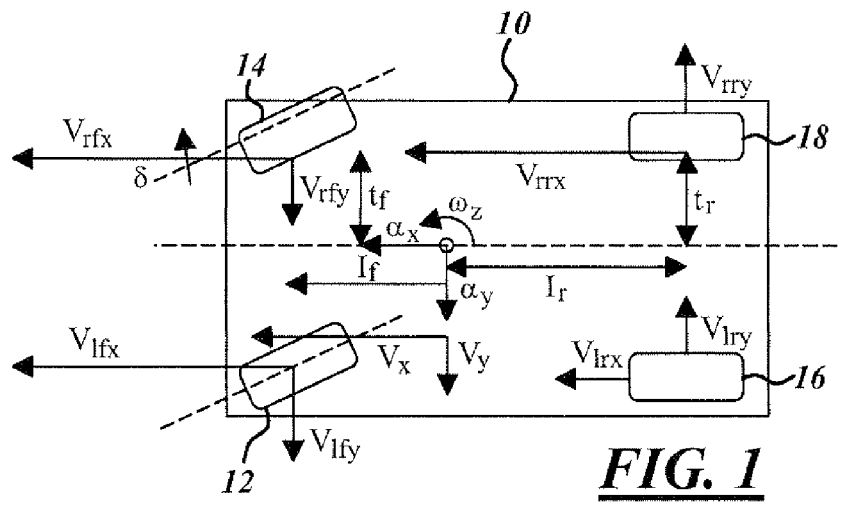
FIG. 1 is a top view of a motor vehicle illustrating various operating parameters of a vehicle experiencing a turning maneuver on a road surface.

In the following figures the same reference numerals will be used to illustrate the same components.

Referring now to FIG. 1, various operating parameters and variables used by the present invention are illustrated as they relate to the application of the present invention to a ground based motor vehicle 10 having wheels 12, 14, 16, 18. Those skilled in the art will immediately recognize the basic physics represented by these illustrations, thereby making the adaptation to different types of vehicles easily within their reach. A lateral and longitudinal velocities of the center of gravity are denoted as $V_x$ and $V_y$, a yaw angular rate is denoted as $\omega_x$, a front wheel steering angle is denoted as $\delta$, lateral acceleration is represented by $a_y$, longitudinal acceleration is represented by $a_x$.

Using those vehicle motion variables, the velocities of the vehicle at the four corner locations, where the wheels are attached to the vehicle, can be calculated in the following form which are projected along the body fixed longitudinal and lateral directions:

$$V_{lfx}=V_x-\omega_z t_f, \ V_{lfy}=V_y+\omega_z l_f$$

$$V_{rfx}=V_x+\omega_z t_f, \ V_{rfy}=V_y+\omega_z l_f$$

$$V_{lrx}=V_x-\omega_z t_r, \ V_{lry}=V_y-\omega_z l_r$$

$$V_{rrx}=V_x+\omega_z t_r, \ V_{rry}=V_y-\omega_z l_r \qquad (1)$$

where $t_f$ and $t_r$ are the half tracks for the front and rear axles, $l_f$ and $l_r$ are the distances between the center of gravity of the vehicle and the front and rear axles. The variables $V_{lf}$, $V_{rf}$, $V_{lr}$ and $V_{rr}$ are the linear velocities of the four corners along the wheel heading directions (left front, right front, left rear and right rear, respectively), which can be calculated as in the following:

$$V_{lf}=V_{lfx}\cos(\delta)+V_{lfy}\sin(\delta)$$

$$V_{rf}=V_{rfx}\cos(\delta)+V_{rfy}\sin(\delta)$$

$$V_{lr}=V_{lrx}$$

$$V_{rr}=V_{rrx} \qquad (2)$$

Figure 2:
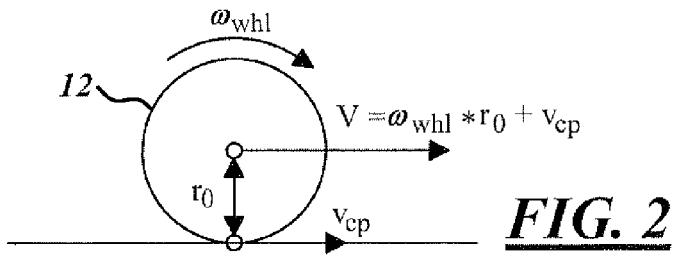
FIG. 2 is a side view of a motor vehicle wheel illustrating various operating parameters of the wheel.

Referring now to FIG. 2, vehicle corner velocity along the wheel longitudinal direction is equal to the sum of the contact patch slip velocity $v_{cp}$ and the product of the wheel rotational rate $\omega_{whl}$ and its rolling radius $r_0$.

Conventional wheel speed sensors comprising a rotating tone ring and associated fixed sensor, provide the wheel rotational rate data. However, as mentioned above, during certain tire loading events, the resulting physical separation between the tone ring and sensing element can impair the sensor functionality and reliability.

Figure 3:
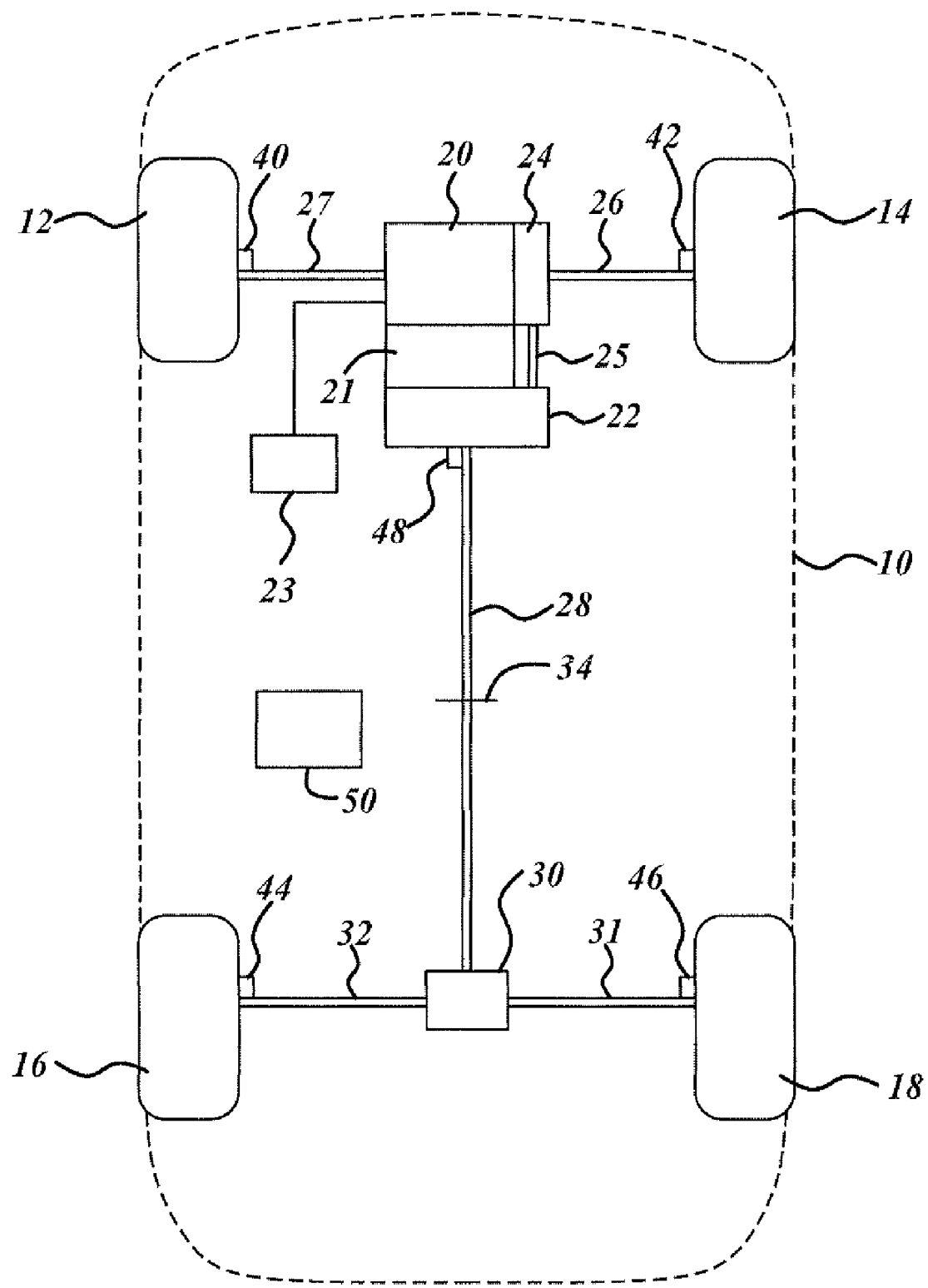
FIG. 3 is a plan view of a motor vehicle driveline in which the present invention may be used to advantage.

FIG. 3 shows a plan view of a motor vehicle driveline in which the present invention may be used to advantage. The driveline is a four-wheel drive vehicle driveline wherein the wheel speed sensing method of the present invention may be implemented. Although shown in the context of a four-wheel drive system, the present invention is equally applicable to front-drive, rear-drive, and all wheel drive systems. Further, the invention is equally applicable to semi-float and full-float axle configurations.

The vehicle 10 includes an internal combustion engine 20 or other engine known in the art such as diesel, hybrid, etc., that is connected to a transmission 21. The transmission includes a power takeoff unit such as a transfer case 22. The engine 20 is controlled by an engine control unit (ECU) 23 which, typically, is microprocessor based. The ECU 23 may also control the transmission 21, or the transmission may have its own associated controller as part of or separate from the ECU. The front differential 24 is connected to the transfer case 22 by a front propeller shaft 25. The front differential has a right hand sideshaft 26 and a left hand sideshaft 27, each of which deliver power to the right wheel 14 and left wheel 12, respectively. A further propeller shaft 28 connects the transfer case 22 to the rear differential 30. The rear differential 30 is coupled to a rear right hand sideshaft 31 and a rear left hand sideshaft 32, each of which is connected to a respective wheel 18, 16. The propeller shaft 28, as shown, is a two-piece shaft coupled by a high speed constant velocity universal joint 34, and supported along the vehicle body by an intermediate shaft bearing. Each end of the propeller shafts 25, 28 and sideshafts 26, 27, 31, 32 can include a rotary joint such as a constant velocity universal joint to transmit power to the wheels even if the wheels or shafts have changing relative angles due to steering or raising or lowering of the suspension of the vehicle. The constant velocity joints may be any of the standard types known such as plunging tripod, cross-groove, hybrid cross-groove, double-offset or any other type of constant velocity joint.

Axle designs can vary in load handling, bearing and flange type, and gearset configuration. A semi-floating axle is very common on the rear driveline of many vehicles. In the example of FIG. 3, a conventional semi-floating axle consists of an axle shaft 31, 32 on each side that is splined on the inner end where it mates to the differential 30, and a wheel flange at the other end where the wheel studs mount. This assembly typically mates to the end of a housing surrounding the by a flange arrangement. The axle shaft also rides on a large roller or ball bearing out at the end of the axle housing. The axle shaft in a semi-floating assembly serves two primary purposes. First, it attaches to the wheel and is used to support the weight of the vehicle and its cargo. Second, the axle shaft transmits the rotational torque from the differential 30 out to the respective wheel 16, 18. An open differential is a device, usually consisting of gears, for allowing each of the driving wheels to rotate at different speeds, while supplying torque to each of the wheels. Semi-float axle configuration are susceptible to axle deflection which can compromise wheel speed sensor accuracy.

A common design that provides a very stiff axle to reduce deflection is referred to as full float and has axle shaft bearing surfaces adjacent to both sides of the tone wheel location. A full-floating axle can be found as the rear driveline of many vehicles as well, but it is generally reserved for vehicles that are designed for severe duty, or are intended to carry heavy loads. This type of axle uses an axle shaft on each side that is simply splined at both ends, or splined on the inner end and has a drive flange on the outer end. The shaft mates to the differential in the same way as a semi-float design. However, the outer end of the shaft differs. Here, the splined end of the shaft slides into a locking hub or an internal splined steel drive plate that bolts to a hub cap, similar to what is found on a front axle. In some cases, the drive flange may be part of the shaft itself. In either case, the axle shaft is allowed to float in the system. For a full-float system, the axle shaft only serves to transmit the rotational torque from the differential out to the wheel. It does not carry the weight of the vehicle like a semi-float design. On a full float system, a spindle is attached to the outer end of the axle housing. The hub's cap is attached to this spindle and rides on tapered roller bearings. It is this assembly that carries the vehicle weight. As such, a full-floating axle system is considerably stronger than an equivalently sized semi-floating system. However, full-float systems also significantly increase both cost and weight as compared to a semi-float design.

The present wheel speed sensing scheme can be implemented in either a full-float or semi-float axle design.

Each of the wheels 12, 14, 16, 18 includes a wheel speed sensor 40, 42, 44, 46. The wheel speed sensors are of the tone ring and sensing element type. The wheel speed sensors generate signals corresponding to the rotational speed at each associated wheel. As explained above, given the rotational speed and rolling radius of the wheel, the longitudinal velocity at each wheel can be readily determined.

A transmission output shaft sensor (OSS) 48 is also included which provides rotational speed data for transmission output shaft which drives the propeller shaft 28. The propeller shaft 28, in turn, drives the rear differential 30. A similar sensor could also or alternatively be included in association with the front propeller shaft 25. The OSS 48 may be any one of the known speed sensing devices. In one example, it is similar in design to the wheel speed sensors and includes a rotating tone ring (toothed ring) and associated stationary pickup sensor.

A vehicle dynamics control system 50 communicates with the various vehicle systems to provide a desired vehicle dynamic control. The control system 50 may be or include a roll stability control system, an electronic stability control system, a yaw stability control system, or some other stability control system known in the art. It may also be used with, or be part of safety systems including an active/semi-active suspension system, anti-roll bar system, airbag system, active restraint system, or other safety system or device deployed or activated upon sensing predetermined dynamic conditions of the vehicle.

The control system 50 is in operative communication with each of the wheel speed sensors 40-46, as well as the transmission output shaft sensor 48, either directly, or by way of the vehicle communication network. The network may be a vehicle high-speed communication area network (HSCAN) with a centralized information bus with which the various controllers can communicate. One or more of the various speed sensors may provide data to the communications bus by wireless transmission. Of course, this would require associated receivers and transmitters.

Figure 4:
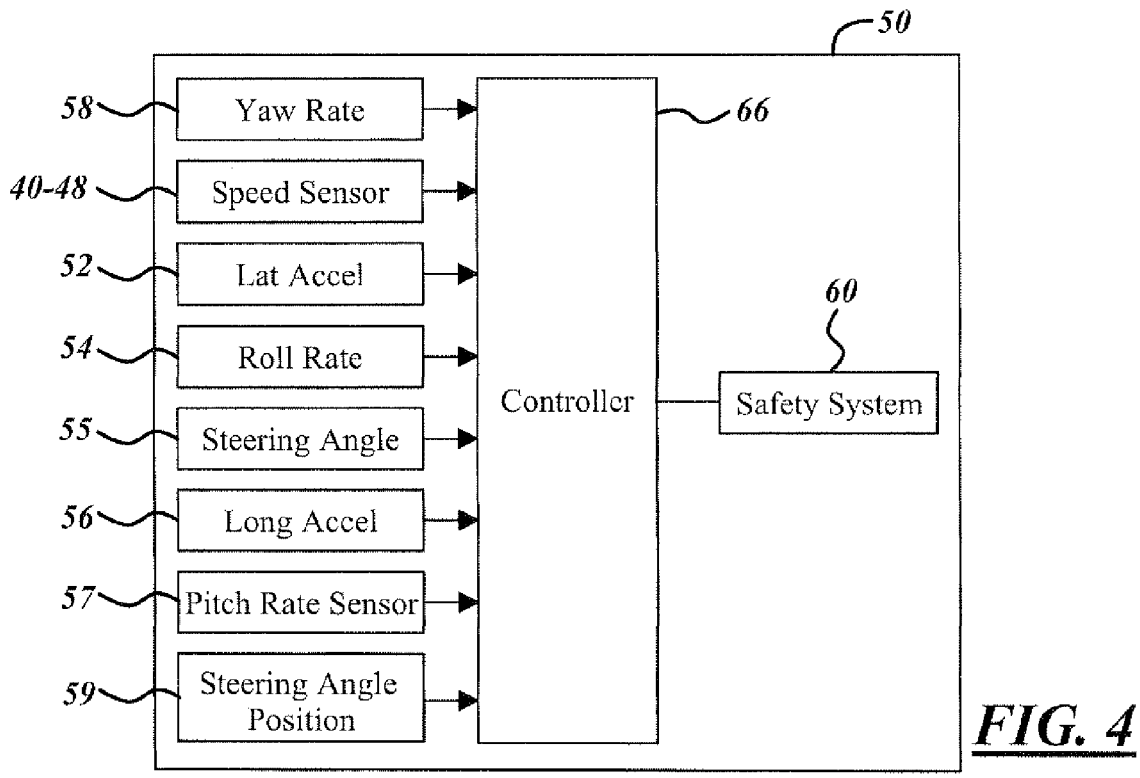
FIG. 4 is a block diagram of a vehicle control system incorporating wheel speed sensing, in which the present invention may be used to advantage.

FIG. 4 is a block diagram of a vehicle control system incorporating wheel speed sensing, in which the present invention may be used to advantage. FIG. 4 shows a control system 50 which may be a stability control system. The control system 50 has a controller 66 used for receiving information from a number of sensors which may include a yaw rate sensor 58, wheel speed sensors 40-46 and OSS 48, a lateral acceleration sensor 52, a roll rate sensor 54, a steering angle (hand wheel position) sensor 55, a longitudinal acceleration sensor 56, a pitch rate sensor 57, and steering angle position sensor 59. Steering angle position sensor 59 senses the position of the steered road wheels. Lateral acceleration, longitudinal acceleration, yaw rate, roll orientation and speed may also be obtained using a global positioning system (GPS). Based upon inputs from the sensors, controller 66 controls the safety system 60.

Controller 66 may be microprocessor based such as a computer having a central processing unit, memory (RAM and/or ROM), and associated input and output buses. The controller may be an application-specific integrated circuit or may be formed of other logic devices known in the art. The controller 66 may be a portion of a central vehicle main control unit, an interactive vehicle dynamics module, a restraints control module, a main safety controller, may be combined with other controllers into a single integrated controller, or may be stand-alone controller as shown.

Depending on the desired sensitivity, the type of safety system and various other factors, not all the sensors may be used in a commercial embodiment. Other factors may be obtained from the sensors such as the surface mu and the vehicle side slip angle. Also, the sensor information may be used for various determinations, such as to determine a wheel lifting event like an imminent rollover, determine various forces including normal forces at the wheels, determine a height and position of a mass, determine the instability trend of the vehicle dynamics as in unstable roll or yaw motions, determine the intentions of a driver, determine the feedforward control commands to drive actuators, determine feedback control commands for the desired functions, and the like.

Further, although each of the sensors are shown as directly communicating with the controller 66, an integrated sensing system (signal multiplexer) may also be included wherein the sensor data is centralized and made available to the controller 66 by way of a communications bus.

Roll rate sensor 54 and pitch rate sensor 57 may sense the roll condition to be used with a rollover control system as an extension of the present application.

Safety system 60 may be a number of types of safety systems including a roll stability control system, a yaw control system, antilock brakes, traction control, airbags, or active suspension system. Safety system 60 may control a position of a front right wheel actuator, a front left wheel actuator, a rear left wheel actuator, or a right rear wheel actuator. Based on the inputs from sensors 40-48, 52-59, controller 66 determines the vehicle dynamic conditions and controls the safety system 60. Controller 66 may also use brake control coupled to front right brakes, front left brakes, rear left brakes, and right rear brakes to dynamically control the vehicle. By using brakes in addition to steering control some control benefits may be achieved. For example, yaw control and rollover control may be simultaneously accomplished.

Figure 5:
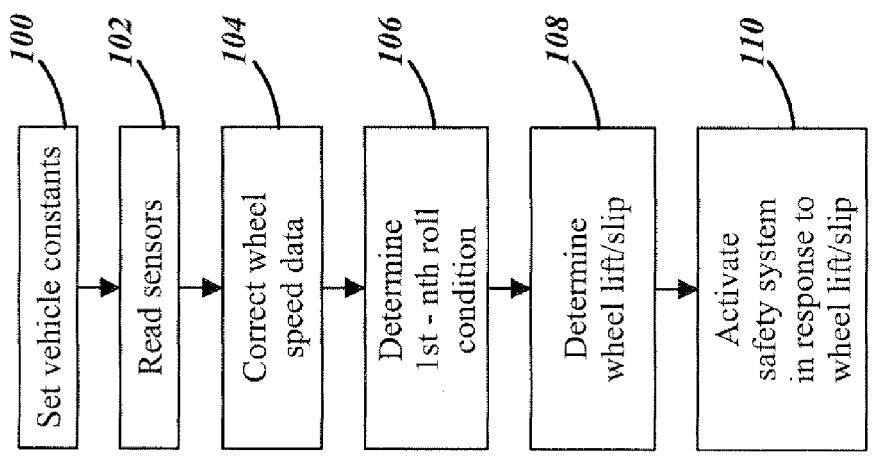
FIG. 5 is a logic flow diagram in accordance with an embodiment of the present invention.

FIG. 5 is a logic flow diagram in accordance with an embodiment of the present invention. FIG. 5 shows one method of operating a safety system using improved wheel speed sensing. In this example, the wheel speed data is used to declare a wheel lift or wheel slip condition. In response to a detected wheel lift or wheel slip, an appropriate safety system is activated.

In step 100, the vehicle constants are determined or called from a lookup table. The vehicle constants are determined during vehicle testing and vary with different suspensions and vehicle configurations. Such vehicle constants include suspension resultant roll stiffness, roll damping rates, the height of the center of gravity of the vehicle, the masses of the vehicle including the inertial masses which include the roll moments of inertia of the front and rear wheel tire assemblies around the contact patches of the outer tires, and the total masses of the front and rear wheels/tires/suspension assemblies. Some of this information may also be provided by appropriate sensors, such as vehicle load sensors and ride height sensors.

In step 102, the various sensors are read. The various sensors may include the sensors in FIG. 2. In step 104, the OSS data 48, and wheel speed data from the wheel speed sensors 40-46 is analyzed. As mentioned above, one way for an electronic stability control system to determine whether a wheel is in a slip condition is to calculate individual wheel slip by monitoring wheel speeds. This requires continuous knowledge of the individual wheel speeds. To mitigate any error in the wheel speed data, the OSS data 48 is used to confirm the accuracy of the wheel speed sensor output.

In the example of FIG. 3, with respect to the rear wheels 16, 18, the rear wheel rotations and the transmission output shaft 28 are kinematically constrained to each other through the open differential 30. Thus, by measuring any two of these three rotational speeds and knowing the number of teeth on the speed sensor tone wheels, and the final drive ratio of the differential, the controller 66 can calculate the speed of the third rotation. Making use of the three speed measurements provides an extra signal which can be used to cross-check the quality of the other signals. Of course, the same scheme can be applied to the front wheels 12, 14 and the front drive shaft 25 speed signal.

The OSS signal 48 can be highly reliable and not subject to the drop out that may be experienced by wheel end sensors 44, 46 subject to large axle deflections. When a signal disagreement occurs, the OSS signal 48 can be used to calculate the erroneous wheel end speed signal, and that value can be used by the ESC system in place of the erroneous signal during that particular period of disagreement between the wheel speed signals. Given the short duration of large axle deflections and the nature of the vehicle forces that cause them, it is highly unlikely that both rear wheel speed measurements would drop out at the same time.

The method described above can be used to calculate two values of wheel speed for each rear wheel 16, 18 and one value for the transmission output shaft 28. If both values agree, either can be used. If the values are different, there are several methods for determining which value is more accurate. By using one or more of the additional methods described below, the selection of the most accurate wheel speed can occur. The wheel speed correction scheme is explained in further detail with respect to FIG. 6.

One example of determining a longitudinal velocity from the wheel speed follows. The wheel speed sensor outputs usually are calibrated for providing the linear directional velocities $V_{lf}$, $V_{rf}$, $V_{lr}$ and $V_{rr}$ by multiplying the wheel rotational angular speeds with a nominal rolling radius of the wheels. The present invention improves the robustness of the calculated linear directional velocities, by improving the data provided for the wheel angular rotational speed.

The variables $\omega_{lf\text{-}sensor}$, $\omega_{rf\text{-}sensor}$, $\omega_{lr\text{-}sensor}$ and $\omega_{rr\text{-}sensor}$ are the wheel angular velocity at the left-front corner, right-front corner, left-rear corner and rear-right corner respectively. The nominal rolling radius (typically used in ABS) for calculating wheel speeds from the wheel rotational rates is $r_0$. Thus, the linear directional velocities may be represented by:

$$v_{lf} = \omega_{lf\text{-}sensor} r_0$$

$$v_{rf} = \omega_{rf\text{-}sensor} r_0$$

$$v_{lr} = \omega_{lr\text{-}sensor} r_0$$

$$v_{rr} = \omega_{rr\text{-}sensor} r_0 \quad (3)$$

Notice that the wheels have different rolling radii than $r_0$. Hence, in order to accurately calculate the actual linear velocities at the four corners, correction factors need to be added. The individual correction factors are denoted as $K_{lf}$, $K_{rf}$, $K_{lr}$ and $K_{rr}$ for the left-front, right-front, left-rear and rear-right corners, respectively. Thus, the linear directional velocities may then be represented by:

$$v_{lf} = K_{lf} \omega_{lf\text{-}sensor} r_0$$

$$v_{rf} = K_{rf} \omega_{rf\text{-}sensor} r_0$$

$$v_{lr} = K_{lr} \omega_{lr\text{-}sensor} r_0$$

$$v_{rr} = K_{rr} \omega_{rr\text{-}sensor} r_0 \quad (4)$$

Notice also that the wheels experience not only the rotational motion but also the linear sliding motion, or longitudinal slip. The slip is caused by the relative motion between the wheel and the road at the contact patch (CP). The longitudinal velocities of the relative motions at the contact patches are denoted as $v_{cp\text{-}lf}$, $v_{cp\text{-}rf}$, $v_{cp\text{-}lr}$ and $v_{cp\text{-}rr}$. Thus, the vehicle corner velocities can be expressed as the sums of two speeds as in the following:

$$V_{lf} = v_{cp\text{-}lf} + v_{lf}$$

$$V_{rf} = v_{cp\text{-}rf} + v_{rf}$$

$$V_{lr} = v_{cp\text{-}lr} + v_{lr}$$

$$V_{rr} = v_{cp\text{-}rr} + v_{rr} \quad (5)$$

Referring again to FIG. 5, in step 106, a first through Nth roll condition is determined. The conditions may include a relative roll angle and a wheel departure angle calculated from a roll rate sensor and a lateral acceleration sensor, a rolling radius-based wheel departure angle, normal loading at each wheel, an actual road torque and a wheel longitudinal slip. At least three determinations are desirable. However, for a more robust system as many as five or more roll conditions may be determined.

In step 108 wheel lift or wheel slip in response to the roll conditions and wheel speed data is determined. In step 110, the appropriate safety system is activated in response to a detected wheel slip or lift event, for example. Thus, a rollover control system may be activated to counter vehicular rolling motion in response to the wheel lift or wheel slip signal. As well, actuation may be based on a roll angle while the wheel lift detection may be used to adjust various parameters such as relative roll angle or the road bank angle.

Figure 6:
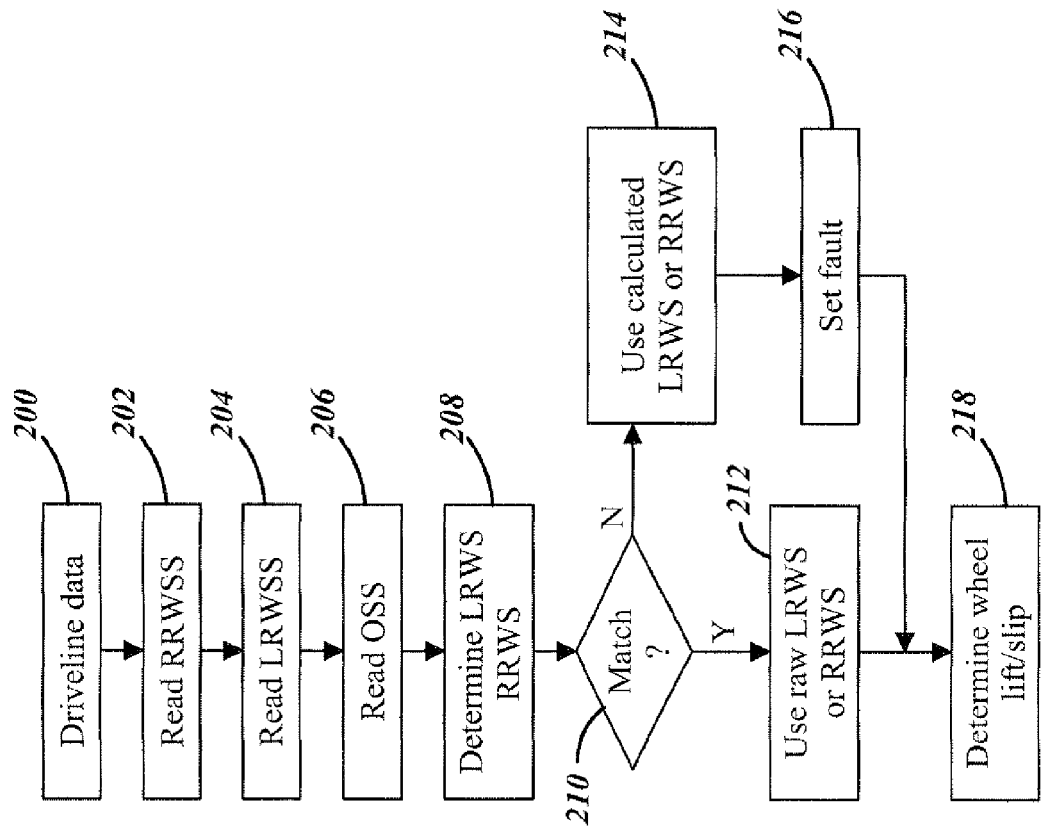
FIG. 6 is a logic flow diagram in accordance with an embodiment of the present invention for confirming wheel speed data.

FIG. 6 is a logic flow diagram in accordance with an embodiment of the present invention for confirming wheel speed data. FIG. 6 shows a detailed view of steps 104 and 108 of FIG. 5. As in the example of FIG. 5, FIG. 6 will be explained in the context of the rear wheels and rear differential only, although the method is equally applicable to front drive or all wheel drive systems.

The logic begins at step 200 where driveline data is determined. Driveline data includes the final drive ratio of the rear differential 30 associated with the rear wheels 16, 18, and may include the tire rolling radius and tone ring tooth count of each respective wheel speed sensor 44, 46. This data is obtained from a lookup table of values stored in memory associated with a vehicle controller which may be controller 66. The data may be provided over the vehicle HSCAN bus.

Steps 202, 204, and 206 read the raw data from the right rear wheel speed sensor (RRWSS) 46, left rear wheel speed sensor (LRWSS) 44, and OSS 48.

In step 208, the left rear wheel speed and right rear wheel speed are calculated as a function of the OSS data and driveline data. As mentioned above, the output shaft speed and rear sideshaft speeds (wheel speeds) are kinematically related through the rear differential. Specifically, the transmission output shaft rotational speed divided by the drive ratio of the differential equals the average rotational speed of each rear sideshaft and, hence, each rear wheel. Thus, either of the rear wheel rotational speeds can be determined by multiplying the known average rotational speed by two (2) and subtracting the measured rotational speed of the opposing wheel. That is:

$$RRWS=[(OSS/drive\ ratio)*2]-LRWS_{measured}$$

$$LRWS=[(OSS/drive\ ratio)*2]-RRWS_{measured}$$

In step 210, the calculated RRWS and LRWS are compared against the measured values, respectively. If the measured and calculated values are within an acceptable error range, either value can be used. In one example, if a match occurs, the measured data value is used in step 212 for subsequent system calculations and determinations. If the calculated and measured values are outside an acceptable error range, the calculated value is used in step 214 for subsequent system calculations and determinations.

In subsequent passes through the logic, upon detecting consecutive divergent values for the measured and calculated wheel speed, or divergent values for a predetermined period of time (i.e., greater than 0.2 seconds), a fault flag may be set as in step 216 to indicate a potential wheel speed sensor fault.

The logic then continues to step 218 wherein the confirmed wheel speed data can be used for subsequent operations such as determining wheel lift or wheel slip.

In one example, additional error checking is implemented in the control logic. The OSS signal is typically highly reliable because it does not experience similar load conditions as experienced at the vehicle wheel hubs. Since the OSS signal is highly reliable, it can be used in subsequent computations. By comparing the value of a wheel speed calculated directly from a wheel speed sensor with the value calculated from the OSS and the opposite wheel speed sensor—the determination can be made as to which wheel speed sensor is most likely accurate.

Other factors can also be used to assess whether a wheel speed sensor is likely to have a signal drop out due to noise or deflection (air gap expansion). For example, a wheel speed signal may drop out because of large axle deflections. Large axle deflections can occur for a number of reasons, such as operation on rough road, a highly dynamic maneuver by the vehicle, and a high vehicle payload (contributing factor). Knowledge of these conditions can improve the logic implemented in step 210 to improve wheel speed signal robustness.

For example, steering wheel angle can indicate highly dynamic vehicle maneuvers, as can lateral acceleration, yaw and roll data. In the presence of any event which is more likely to compromise the wheel speed sensor reliability, the permissible error between a calculated and measured wheel speed value can be modified. For instance, the acceptable divergent error range may be narrowed as function of vehicle lateral acceleration.

This dynamic vehicle information may also be used to more closely scrutinize the measured sensor data for the wheels on the side of the vehicle experiencing increased load as a result of the vehicle dynamics, because they are more likely to experience sensor deflection. Thus, if the dynamic sensors indicate that the vehicle is experiencing roll to the right, the left wheel speed sensors are more likely to provide accurate measured data whereas the right side wheel speed sensors are more likely to provide compromised measured data. If time or computational resources are limited, the calculated values can be determined only for the side more likely to experience sensor deflection.

Vehicle load can be estimated by estimating torques needed to accelerate and decelerate the vehicle. The estimate of vehicle load can be used to modify thresholds used to select valid wheel speed calculations as well as set fault thresholds.

In order to mitigate the potential severity of wheel speed error, it is also possible to use the above logic for only some modes of control or not use individual wheel speed signals at all.

In one example, an antilock brake control system is particularly vulnerable to errors in speed calculations that over-estimate wheel speed. Thus, for an antilock control strategy, it may be beneficial to use only the OSS signal for antilock control of the rear wheels—as it is well-established practice to provide antilock control using only a single rear wheel speed signal similar to that provided by the OSS.

In another example, traction control may also be vulnerable to errors in speed calculations that over-estimate the actual wheel speed. Traction control relates specifically with the lateral (front-to-back) loss of friction during acceleration. For instance, when a vehicle accelerates from a dead stop, or speeds up while passing another vehicle, traction control works to ensure maximum contact between the road surface and the tires, even under less-than-ideal road conditions. Traction control is robust to wheel speed values (on driven wheels) that are lower than the actual values, but not to wheel speed values that are higher than actual. For traction control it may be beneficial to use the individual wheel speeds without any value calculated from the OSS.

Thus, the step 210 may be modified as a function of dynamic vehicle information, as well as the particular control mode under consideration.

While particular embodiments of the invention have been shown and described, numerous variations and alternate embodiments will occur to those skilled in the art. Accordingly, it is intended that the invention be limited only in terms of the appended claims.

What is claimed is:

1. A control system for controlling a safety system of an automotive vehicle having a transmission and a differential, the system comprising,
 a left and right wheel speed sensor associated with a respective vehicle wheel and generating left and right wheel speed signals, respectively;
 a transmission output shaft speed sensor generating a transmission output shaft speed signal; and
 a controller coupled to the wheel speed sensors and the transmission output speed sensor, said controller determining a reference wheel speed for one of the left or right wheels as a function of the other of the left or right wheel speed signal and the transmission output shaft speed signal, said controller controlling the safety system in response to the determined reference wheel speed.

2. A system as in claim 1 wherein the reference wheel speed is further determined as a function of a drive ratio of the differential.

3. A system as in claim 1 wherein the safety system comprises at least one of a stability control system, a rollover control system, a traction control system, or an antilock braking system.

4. A system as in claim 2 wherein the final reference wheel speeds are determined according to:

$$RWS=[(OSS/\text{drive ratio})*2]-LWS_{measured}$$

$$LWS=[(OSS/\text{drive ratio})*2]-RWS_{measured}$$

wherein OSS is the transmission output shaft speed, and $LWS_{measured}$ and $RWS_{measured}$ are the left and right wheel speed signals, respectively.

5. A system as in claim 1 wherein each wheel speed sensor comprises a ring associated with a wheel hub and a pickup sensor associated with an axle shaft housing.

6. A method of controlling a safety system for an automotive vehicle having a transmission and an associated differential operatively driving left and right wheels, the wheels each having a wheel speed sensor, the method comprising:
   generating left and right wheel speed signals from each respective wheel speed sensor;
   determining a transmission output shaft speed;
   determining a drive gear ratio of the differential;
   determining a reference wheel speed for one of the left or right wheels as a function of the other of the left or right wheel speed signal, the transmission output shaft speed, and the drive gear ratio; and
   controlling a safety system with one of the determined reference wheel speed or generated wheel speed.

7. The method of claim 6 further comprising the step of comparing a difference between the respective generated wheel speed signal and the determined reference wheel speed with a fault tolerance, when the difference exceeds the fault tolerance, controlling the safety system with the determined reference wheel speed.

8. The method of claim 6 further comprising the step of comparing a difference between the respective generated wheel speed signal and the determined reference wheel speed with a fault tolerance, when the difference is within the fault tolerance, controlling the safety system with the generated reference wheel speed.

9. The method of claim 7 further comprising the step of modifying the fault tolerance in response to a load condition of the wheels.

10. The method of claim 8 further comprising the step of modifying the fault tolerance in response to a load condition of the wheels.

11. The method of claim 6 further comprising the step of determining a load condition of the left or right wheel, and controlling the safety system with the reference wheel speed for a wheel experiencing increased loading as a result of a vehicle dynamic state.

12. The method of claim 6 wherein the right and left reference wheel speeds are determined according to:

$$RWS=[(OSS/\text{drive ratio})*2]-LWS_g$$

$$LWS=[(OSS/\text{drive ratio})*2]-RWS_g$$

wherein OSS is the transmission output shaft speed, and $LWS_g$ and $RWS_g$ are the generated left and right wheel speed signals, respectively.

13. A vehicle system comprising:
   a transmission having an output shaft;
   a differential operatively connected to the output shaft, and having an associated drive ratio;
   left and right wheel operatively connected to the differential for providing motive force to the vehicle;
   left and right wheel speed sensors, respectively generating left and right wheel speed signals;
   a transmission output shaft speed sensor generating a transmission output shaft speed signal; and
   a controller coupled to the wheel speed sensors and the transmission output speed sensor, said controller determining a reference wheel speed for one of the left or right wheels as a function of the other of the left or right wheel speed signal, the transmission output shaft speed signal, and the drive ratio, the controller controlling a safety system in response to the determined reference wheel speed.

14. A system as in claim 13 wherein the safety system comprises at least one of a stability control system, a rollover control system, a traction control system, or an antilock braking system.

15. A system as in claim 13 wherein the reference wheel speeds are determined according to:

$$RWS=[(OSS/\text{drive ratio})*2]-LWS_g$$

$$LWS=[(OSS/\text{drive ratio})*2]-RWS_g$$

wherein OSS is the transmission output shaft speed, and $LWS_g$ and $RWS_g$ are the generated left and right wheel speed signals, respectively.

16. A system as in claim 13 wherein the controller includes logic programmed to compare a difference between the respective generated wheel speed signal and the determined reference wheel speed with a fault tolerance and, when the difference exceeds the fault tolerance, control the safety system with the determined reference wheel speed.

17. A system as in claim 13 wherein the controller includes logic programmed to compare a difference between the respective generated wheel speed signal and the determined reference wheel speed with a fault tolerance and, when the difference is within the fault tolerance, control the safety system with the generated reference wheel speed.

18. A system as in claim 16 wherein the controller logic is further programmed to modify the fault tolerance in response to a load condition of the wheels.

19. A system as in claim 17 wherein the controller logic is further programmed to modify the fault tolerance in response to a load condition of the wheels.

20. A system as in claim 13 wherein the controller logic is further programmed to determine a load condition of the left or right wheel, and control the safety system with the reference wheel speed for a wheel experiencing increased loading as a result of a vehicle dynamic state.

* * * * *